(12) United States Patent
Al-Sehemi et al.

(10) Patent No.: US 12,424,628 B2
(45) Date of Patent: Sep. 23, 2025

(54) P-N ORGANIC BATTERY, A METHOD OF FABRICATING THE BATTERY THEREOF

(71) Applicant: King Khalid University, RCAMS, Abha (SA)

(72) Inventors: Abdullah G. Al-Sehemi, Abha (SA); Aysegul Dere, Elazig (TR); Ahmed A. Al-Ghamdi, Jeddah (SA); Fahrettin Yakuphanoglu, Elazig (TR); Mehboobali Pannipara, Abha (SA)

(73) Assignee: King Khalid University, RCAMS, Abha (SA)

( * ) Notice: Subject to any disclaimer, the term of this patent is extended or adjusted under 35 U.S.C. 154(b) by 758 days.

(21) Appl. No.: 17/659,997

(22) Filed: Apr. 20, 2022

(65) Prior Publication Data

US 2023/0343960 A1 Oct. 26, 2023

(51) Int. Cl.
*H01M 4/60* (2006.01)
*H01M 10/36* (2010.01)
*H01M 4/02* (2006.01)

(52) U.S. Cl.
CPC .......... *H01M 4/608* (2013.01); *H01M 10/36* (2013.01); *H01M 2004/027* (2013.01); *H01M 2004/028* (2013.01); *H01M 2300/0002* (2013.01)

(58) Field of Classification Search
None
See application file for complete search history.

(56) References Cited

U.S. PATENT DOCUMENTS

2010/0216026 A1 * 8/2010 Lopatin ............... H01M 4/1393
429/246
2023/0178714 A1 * 6/2023 Song ..................... H01M 4/622
429/209

* cited by examiner

*Primary Examiner* — Alix E Eggerding
(74) *Attorney, Agent, or Firm* — Avek IP, LLC

(57) ABSTRACT

In the present disclosure, a p-n organic battery comprising a p-type organic semiconductor and n-type organic semiconductor as active electrodes, anode and cathode current electrodes, separator and electrolyte and a method of fabricating the same is disclosed. The p-n organic battery has an p-type organic semiconductor separated from a n type organic semiconductor by an aqueous electrolyte solution, contained in an insulating vessel with suitable terminals (not shown) being provided in electric contact with the anode current electrode and the cathode current electrode. The aqueous electrolyte can comprise water, and a transition metal salt such as $NiCl_2$, $CuCl_2$ dissolved in the water.

17 Claims, 5 Drawing Sheets

P-N ORGANIC BATTERY, A METHOD OF FABRICATING THE BATTERY THEREOF

TECHNICAL FIELD

This patent application is directed to a p-n organic battery device comprising p-type and n-type organic semiconductors and specifically to an organic semiconductor battery with the active electrodes of the battery being p-type and n-type organic semiconductors.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present invention.

The portable electronic devices such as digital cameras, mobile phones, power electrical vehicles and hybrid electrical vehicles and so on need energy for storages such as battery. Over the past decade, lithium ion batteries have been used for portable electronics, such as laptops and mobile phones. The lithium ion batteries have been used in commercial applications in automotive applications, electrical vehicles and hybrid electrical vehicles.

This invention relates to a p-n organic battery using a p type and n type organic semiconductors as active electrodes.

This invention provides a p-n organic battery to prolong its use life and discharging efficiency by using nano structured organic semiconductors. Organic semiconductors such as p type and n type organic semiconductors are used to improve charging and discharging efficiency of the p-n battery using p type and n type organic semiconductors as active electrode in the battery.

SUMMARY

According to a first aspect, the present disclosure relates to the p-n organic battery comprising the electrodes having a p-type and an n-type organic semiconductors are used as battery electrodes to obtain low cost organic battery.

In one embodiment, the first active electrode of the battery can be a n-type organic semiconductor layer with thickness of 0.1-1 mm, and diameter of 10-15 mm.

In one embodiment, the second active electrode of the battery can be a p-type organic semiconductor layer with thickness of 0.1-1 mm and diameter of 10-15 mm.

In one or more embodiments, the p-type and n type organic semiconductors can comprise the compressed powder organic semiconductors.

In one or more embodiments, the separator can comprise a polyamide non-woven fabric may be used as well as a polypropylene non woven fabric.

In one or more embodiments, the pressure for compressed powder organic semiconductors can range from about 1 MPa to about 5 MPa.

In one or more embodiments, the weight concentration of the powder organic semiconductors can range from about 50 mg to about 100 mg.

In one or more embodiments, the aqueous electrolyte can comprise a metal chloride salt. The concentration of aqueous electrolyte can range from about 1 M to about 5 M.

In one or more embodiments, p-type organic electrode can be nano structured polyaniline (PAN) and n-type electrode can be 3,4,9,10-perylenetetracarboxylic dianhydride (PTCDA). In one or more embodiments, the thickness of electrodes can range from 0.5 mm to 2 mm.

In one or more embodiments, the electrolyte/separator can be a microporous film, in which, the electrolyte can comprise a composite solution comprising from copper chloride, $CuCl_2$ and nickel chloride $NiCl_2$ salts.

In one or more embodiments, the electrolyte can contain a dopant in an organic solvent.

In one or more embodiments, the separator can enable the ionic transport between the aluminum and copper electrodes. In one or more embodiments, the current electrodes can comprise aluminum and copper metal plates.

In one or more embodiments, the open circuit voltage of the nano structured polyaniline and 3,4,9,10-perylenetetracarboxylic dianhydride based organic battery can be at least 1.0 V.

In one or more embodiments, the short circuit current of the nano structured polyaniline and 3,4,9,10-perylenetetracarboxylic dianhydride based organic battery can be at least 35 mA.

In one or more embodiments, the maximum power of nano structured polyaniline and 3,4,9,10-perylenetetracarboxylic dianhydride based organic battery is at least 35 mW.

In one or more embodiments, the nano structured polyaniline and 3,4,9,10-perylenetetracarboxylic dianhydride based organic battery further comprises at least one other organic semiconductors selected from the group consisting of small molecules, aromatic molecules, donor and acceptor molecules and conjugated polymers.

According to a second aspect, the present disclosure relates to a battery comprising a of multilayer active electrodes and at plurality least one of the battery comprises an electrolyte, two metal plates, p-type semiconductor and n-type semiconductor contained in a vessel.

Further, the aqueous electrolyte solution of the at least one of the battery comprises water, graphene and a transition metal salt such as $CuCl_2$ dissolved in the water.

In one or more embodiments, a plurality of the battery can be connected electrically in a sandwich structure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

A more complete appreciation of the disclosure and many of the attendant advantages thereof will be readily obtained as the same becomes better understood by reference to the following detailed description when considered in connection with the accompanying drawings, wherein.

DETAILED DESCRIPTION

For simplicity and illustrative purposes, the disclosed systems and methods are described by referring mainly to examples and embodiments thereof. In the following description, numerous specific details are set forth in order to provide a thorough understanding of the disclosed systems and methods. It will be readily apparent, however, that the disclosed systems and methods may be practiced without limitation to these specific details. In other instances, some methods and structures readily understood by one of ordinary skill in the art have not been described in detail so as not to unnecessarily obscure the disclosed systems and methods. As used herein, the terms "a" and "an" are intended to denote at least one of a particular element, the term "includes" means includes but not limited to, the term "including" means including but not limited to, and the term "based on" means based at least in part on.

The present disclosure provides a p-n organic battery comprising a p-type organic electrode, a n-type organic electrode, said p-type and n-type organic electrodes being separated by an organic separator in a metal chloride electrolyte, said p-type electrode being an organic semiconductor and said n-type electrode being an organic semiconductor.

In an embodiment, the p-n organic battery may comprise n-type and p-type organic semiconductors that are composed of compressed, nano structured, powdered carbon based organic semiconductors. The p-n organic electrodes may also be comprised of Cu, and Al.

In an embodiment, the p-n organic battery may comprise the p-type organic semiconductor that may be selected from a group of organic semiconductors consisting of any or a combination of nano polyaniline or its nanocomposites having polyaniline and graphene. The electrical conductivity of the p-type electrode made of nano polyaniline may be $3 \times 10^{-6}$ S/cm or more.

In an embodiment, the p-n organic battery may comprise, the n-type organic semiconductor that may be selected from a group of organic semiconductors consisting essentially of any or a combination of 3,4,9,10-perylenetetracarboxylic dianhydride (PTCDA), fullerene, fullerene 70. The electrical conductivity of the 3,4,9,10-perylenetetracarboxylic dianhydride is at least $10^{-6}$ S/cm.

In an embodiment, the organic semiconductors comprised in the p-n organic battery may have a conductivity of least $10^{-6}$ S/cm. The thickness of the battery electrodes may be in a range of 0.1 mm to 1 mm. The concentration of $CuCl_2$ in the metal chloride electrolyte may range from about 0.5 M to about 5 M.

Figure 1:
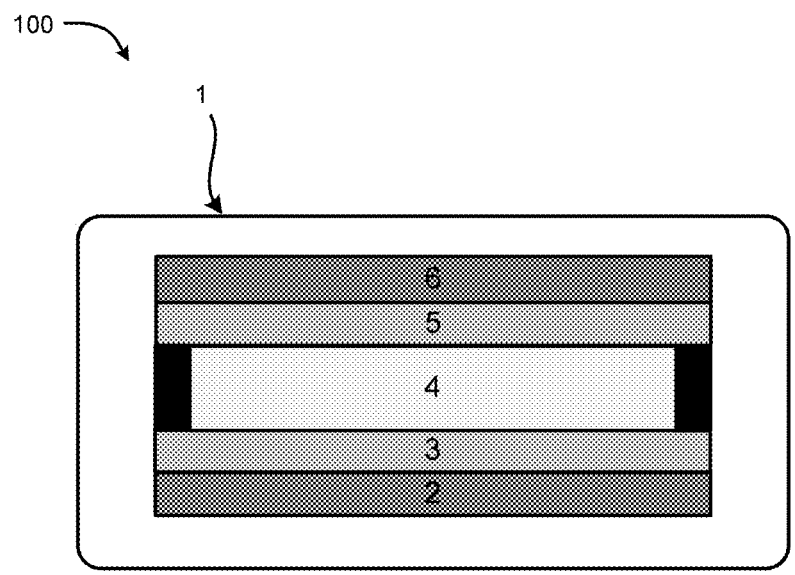
FIG. 1 is a schematic representation of an embodiment of the p-n organic battery in accordance with the present disclosure.
Figure 2A:
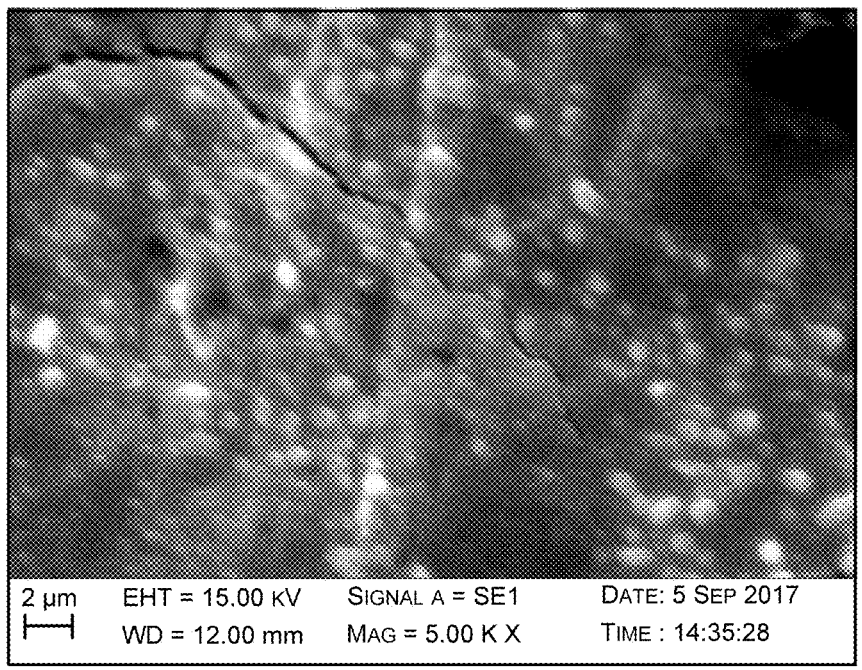
FIGS. 2A and 2B are Scanning electron microscope images of an embodiment of the nanostructured polyaniline and 3,4,9,10-perylenetetracarboxylic dianhydride organic semiconductors in accordance with the present disclosure.
Figure 2B:
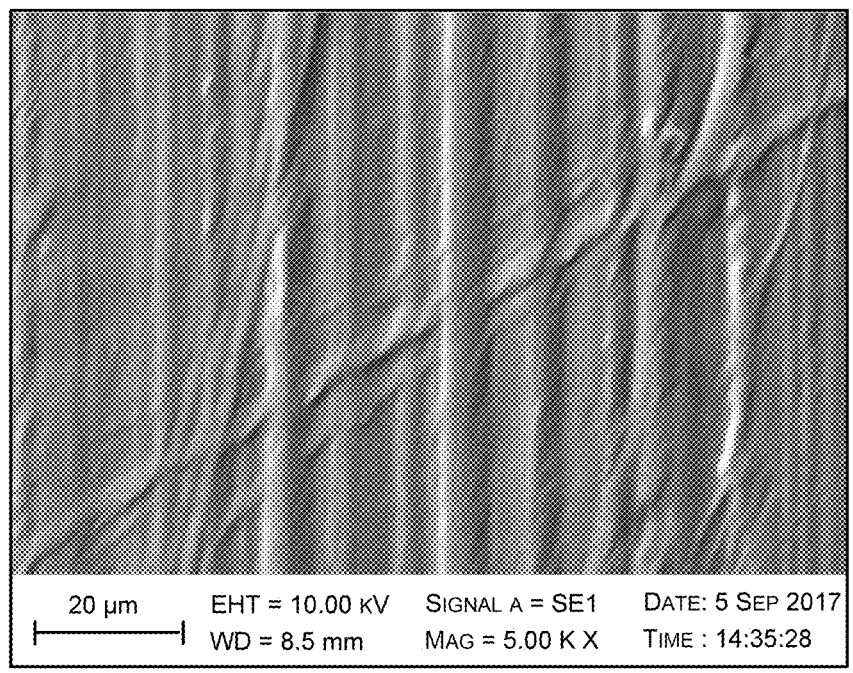

In the present disclosure, a p-n organic battery comprising a p-type organic semiconductor and n-type organic semiconductor as active electrodes, anode and cathode current electrodes, separator and electrolyte are provided. Referring now to FIG. 1, which shows an embodiment in accordance with the present disclosure which is a p-n organic battery 100 having a p-type organic semiconductor 3 separated from a n type organic semiconductor 5 by an aqueous electrolyte solution 4, all contained in an insulating vessel 1 with suitable terminals (not shown) that may be provided in electric contact with the anode current electrode 2 and the cathode current electrode 6. The aqueous electrolyte 4 may comprise water, and a transition metal salt such as $NiCl_2$, $CuCl_2$ dissolved in the water. The open circuit voltage of the organic battery can be 1 V and more. The short circuit current of the p-n organic battery may be at least 35 mA. The maximum power output of the p-n organic battery may be 11 mW and more. The p-type electrode composed of nano polyaniline may generate a power ranging from 5 mW to 15 mW.

The anode of the p-n organic battery can be made of a metal or an alloy. In one embodiment, a current electrode of the battery may be aluminum. In another embodiment, the other current electrode may be copper.

In another embodiment, n-type organic semiconductor can be 3,4,9,10-perylenetetracarboxylic dianhydride organic semiconductor. In another embodiment, p-type organic semiconductor may be polyaniline. In still another embodiment, the active electrode may be an organic semiconductor selected from the group consisting of the polyaniline, polypyrolle, and 3,4,9,10-perylenetetracarboxylic dianhydride In one embodiment, the open circuit voltage of the p-n organic battery is at least 1.0 V. In another embodiment, the open circuit voltage is at least 0.5 V. In another embodiment, the open circuit voltage is at least 0.65 V. In still another embodiment, the open circuit voltage is at least 1 V. In still another embodiment, the open circuit voltage is at least 1.1 V.

In one another embodiment, the short circuit current is at least 10 mA. In one embodiment, the maximum power of the p-n organic battery is at least 13 mW. In another embodiment, the maximum power of the cell is at least 15 mW. In another embodiment, the maximum power of the cell is at least 18 mW. In still another embodiment, the maximum power of the cell is at least 20 mW. In still another embodiment, the maximum power of the cell is at least 25 mW.

The open circuit voltage, the short circuit current, and the maximum power are improved by changing of active electrodes as described in the present disclosure. For example, selecting a n-type organic semiconductor or an p-type organic semiconductor as the active electrode may alter the open circuit voltage and short circuit current. The short circuit current may be changed by changing nanostructure as nanoparticles, nanorods or nanocluster of the organic semiconductors.

In an aspect, a method of fabricating a battery is disclosed. The method includes, sandwiching one or more active layers of a battery such that the active layers are connected to one another in series and at least one of the active layer is a p-n organic battery. The p-n organic battery can be fabricated by sandwiching multi active layers, at least one of which is the p-n organic battery, to one another in series.

In an embodiment, an exemplary illustration for synthesis of nano polyaniline is disclosed. The Polyaniline for electrodes can be synthesized by a chemical method that includes, distillation of pure Aniline, dissolving the nominal molar value of Aniline into Chloroform, mixing with Ammonium Persulphate and HCl to the Aniline solution which may be continued for at least 1 hour.

For the synthesis of polyaniline (PANI), firstly, pure aniline was distilled. The nominal molar value of aniline was dissolved in chloroform. Then, ammonium persulphate in HCl was added to aniline solution and the reaction was continued for 1 h. After 1 h, the obtained PANI was washed and dried.

Figure 3A:
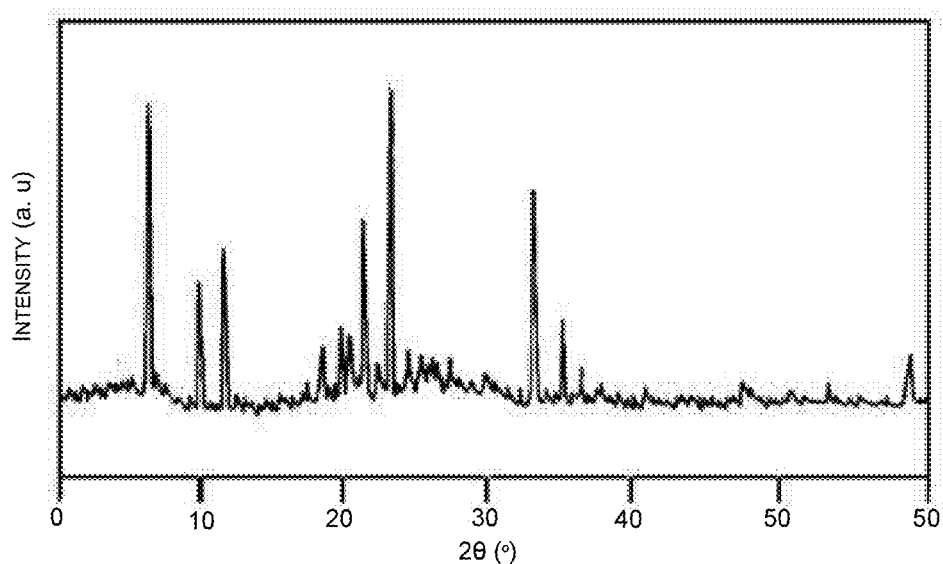
FIG. 3A is an X-ray diffraction diagram of an embodiment of nanostructured polyaniline organic semiconductor in accordance with the present disclosure.
Figure 3B:
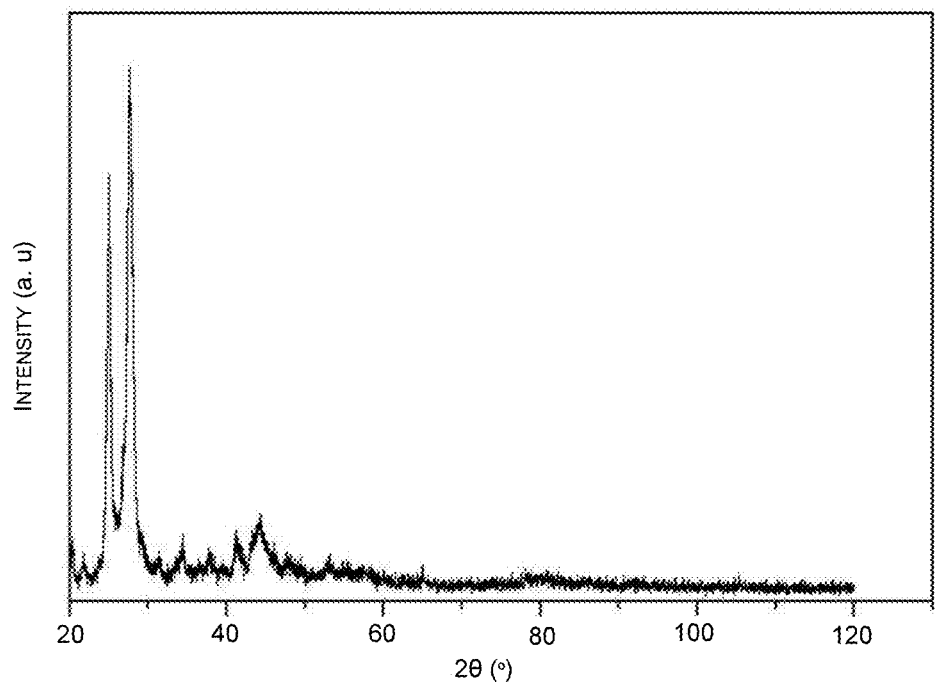
FIG. 3B is an X-ray diffraction diagram of an embodiment of 3,4,9,10-perylenetetracarboxylic dianhydride organic semiconductor in accordance with the present disclosure.

In another embodiment, an X-Ray Diffraction and SEM Analysis of the obtained PANI can be done. The polyaniline synthesized can be subjected to X-ray diffraction analysis. FIG. 3A is an X-ray diffraction diagram of an embodiment of nanostructured polyaniline organic semiconductor in accordance with the present disclosure. FIG. 3B is an X-ray diffraction diagram of an embodiment of 3,4,9,10-perylenetetracarboxylic dianhydride organic semiconductor in accordance with the present disclosure.

Figure 4:
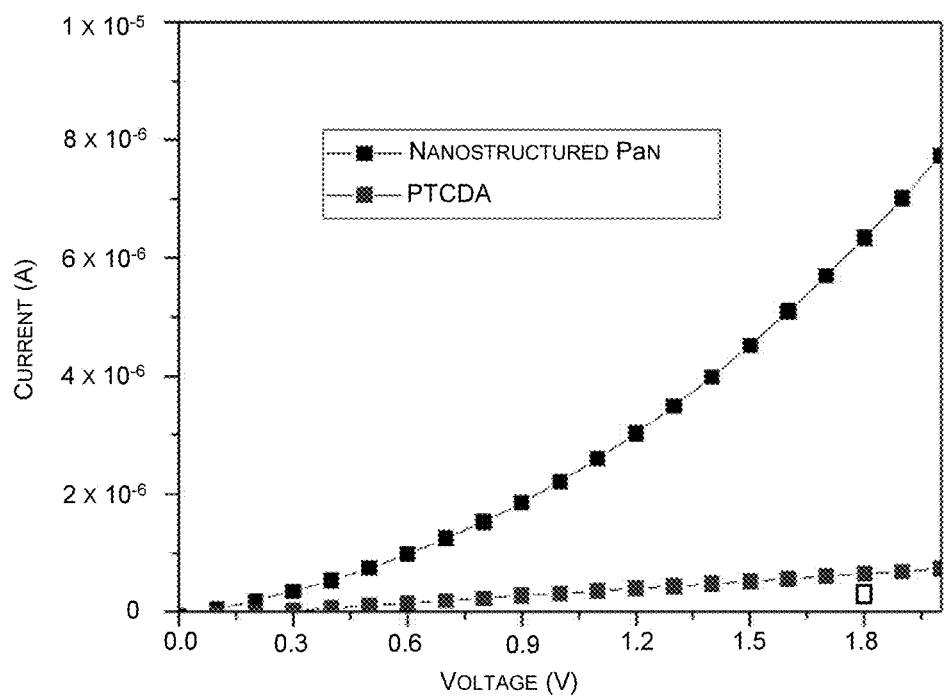
FIG. 4 are the current-voltage characteristics of an embodiment of the nanostructured polyaniline and 3,4,9,10-perylenetetracarboxylic dianhydride organic semiconductors in accordance with the present disclosure.

Referring to FIGS. 3A and 3B, which is an X-ray diffraction diagram of the synthesized Polyaniline. In the sample experiment, the resulting X-ray diffraction diagram as shown in FIG. 3 showed sharp and well resolved peaks. These peaks confirm the crystalline structure of PANI sample Further, the synthesized PANI sample can be subjected to field emission scanning electron microscopy (FESEM). Referring now to FIG. 4, which shows the field emission scanning electron microscopy. The PANI sample may be comprised of nanosheets about 6 nm thick with wrinkled and/or rippled morphologies.

FIG. 1 shows an embodiment of the p-n organic battery with an 3,4,9,10-perylenetetracarboxylic dianhydride as the negative active electrode and a nano structured polyaniline as the positive active electrode. In an embodiment, to fabricate active electrodes, a p-type and n type organic semiconductors may be prepared in the form of the disc on the current electrodes by applying a hydraulic pressure of about 5 ton. The battery cells may be assembled in a cylindrical stain stainless vessel. The electrolyte solution may be prepared by using a 5 M CuCl water solution.

Figure 5:
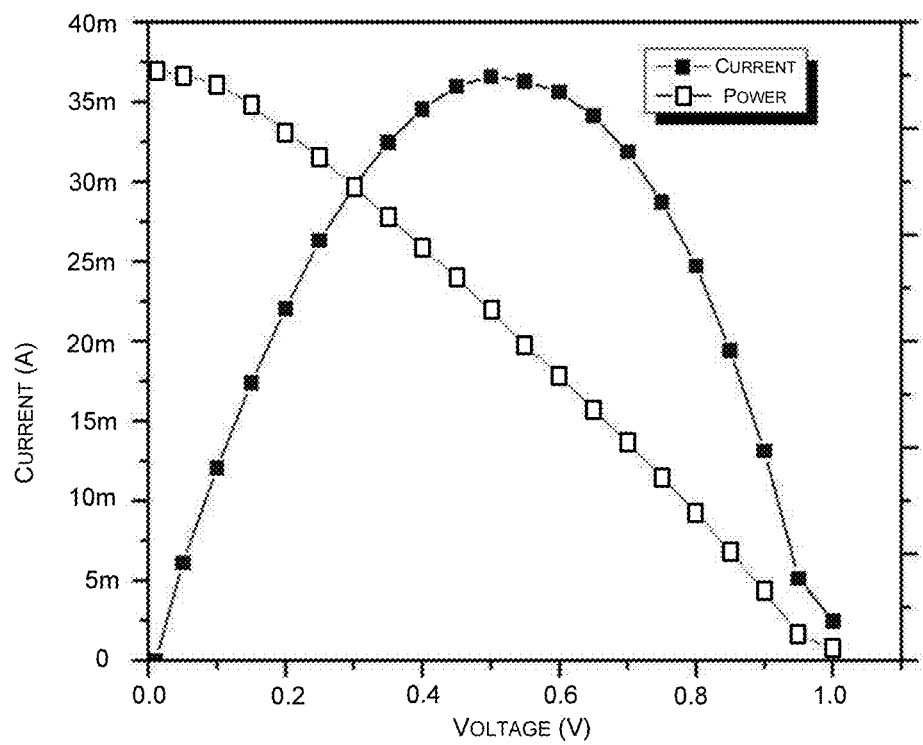
FIG. 5 is a graphical presentation of the current-voltage relationship and the power-voltage relationship of an embodiment of the p-n organic battery in accordance with the present disclosure.

Further, the current-voltage characteristics of the synthesized PANI sample may be recorded to assess the conductivity and the suitability of the synthesized PANI sample. Referring to FIG. 4, the current-voltage characteristics of a sample of the nanostructured polyaniline and 3,4,9,10-perylenetetracarboxylic dianhydride organic semiconductors in accordance with the present disclosure are provided, a The electrical conductivity of nano PANI sample is higher than that of PTCDA. FIG. 5 is a graphical presentation of the current-voltage relationship and the power-voltage relationship of an embodiment of the p-n organic battery in accordance with the present disclosure.

Figure 6:
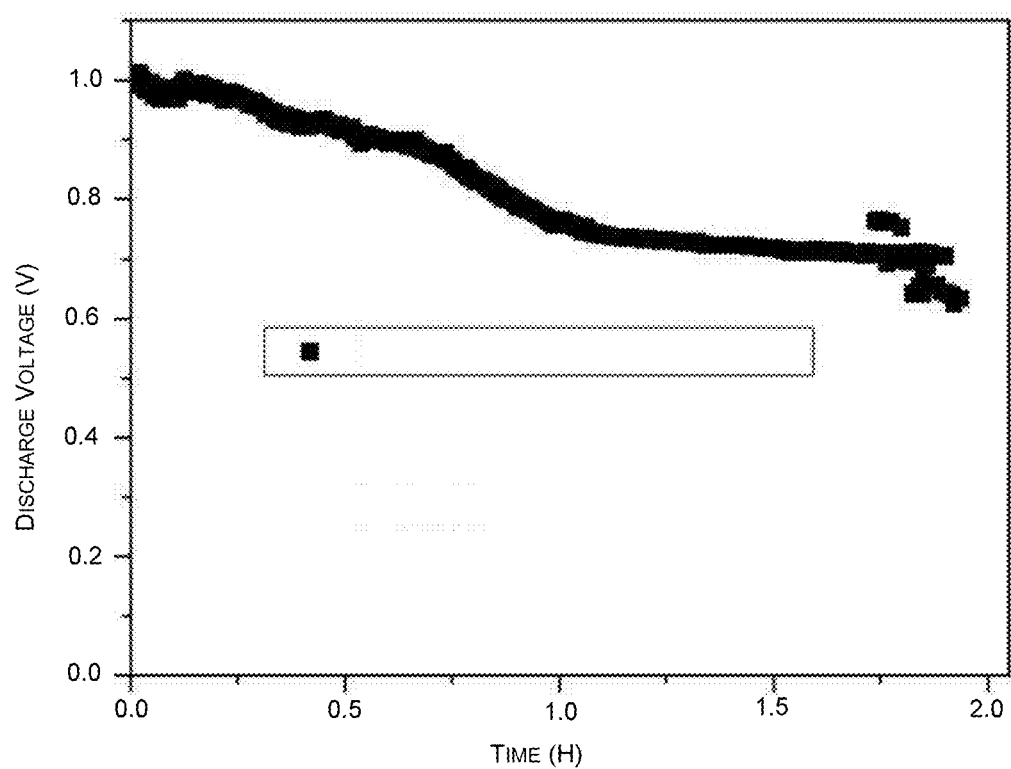
FIG. 6 is a graphical representation of the discharge characteristics of an embodiment of the p-n organic battery in accordance with the present disclosure that generates 1 mA.

FIG. 6 is a graphical representation of the discharge characteristics of an embodiment of the p-n organic battery in accordance with the present disclosure that generates 1 mA. As shown in FIG. 6, the p-n organic battery fabricated above may have an open circuit voltage of 1.0 V, a short circuit current of 35 mA, and a maximum power of more than 35 mW, Further, the output current of the cell could be controlled by changing active electrodes.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A p-n organic battery comprising:
a p-type organic electrode, a n-type organic electrode, said p-type and n-type organic electrodes being separated by an organic separator in a metal chloride electrolyte, said p-type electrode being an organic semiconductor and said n-type electrode being an organic semiconductor.

2. The p-n organic battery of claim 1, wherein the n-type and p-type organic semiconductors are composed of compressed, nano structured, powdered carbon based organic semiconductors.

3. The p-n organic battery of claim 2, wherein the p-type organic semiconductor is selected from a group of organic semiconductors consisting of any or a combination of nano polyaniline or its nanocomposites having polyaniline and graphene.

4. The p-n organic battery of claim 2, wherein the electrical conductivity of the nano polyaniline is at least $3 \times 10^{-6}$ S/cm.

5. The p-n organic battery of claim 1, wherein the N-type organic semiconductor is selected from a group of organic semiconductors consisting essentially of any or a combination of 3,4,9,10-perylenetetracarboxylic dianhydride (PTCDA), fullerene, fullerene 70.

6. The p-n organic battery of claim 5, wherein the electrical conductivity of the 3,4,9,10-perylenetetracarboxylic dianhydride is at least $10^{-6}$ S/cm.

7. The p-n organic battery of claim 1, wherein at least one of the organic semiconductors has a conductivity of least $10^{-6}$ S/cm.

8. The p-n organic battery of claim 1, wherein the total thickness of the battery electrodes is in a range of about 0.1 mm to about 1 mm.

9. The p-n organic battery of claim 1 wherein n-type organic semiconductors comprise small molecule compounds and aromatic compounds.

10. The p-n organic battery of claim 1, wherein concentration of $CuCl_2$ in the metal chloride electrolyte ranges from about 0.5 M to about 5 M.

11. The p-n organic battery of claim 1, wherein the open circuit voltage of said organic battery is at least 1 V.

12. The p-n organic battery of claim 1, wherein the short circuit current of said p-n organic battery is at least 35 mA.

13. The p-n organic battery of claim 1, wherein a maximum power of p-n organic battery is at least 11 mW.

14. The p-n organic battery of claim 1, wherein the p-type electrode composed of nano polyaniline generates a power ranging from 5 mW to 15 mW.

15. A method of fabricating a p-n organic battery, the method comprising
sandwiching a p-type organic electrode and an n-type organic electrode, each comprising an organic semiconductor, on opposing sides of an organic separator in the presence of a metal chloride electrolyte, wherein the p-type organic electrode, the n-type organic electrode, and the organic separator are layered to form a p-n organic battery structure.

16. The method of claim 15, wherein the p-type organic electrode is an organic semiconductor selected from a group of organic semiconductors consisting of any or a combination of nano polyaniline or its nanocomposites having polyaniline and graphene.

17. The method of claim 15, wherein the n-type organic electrode is selected from a group of organic semiconductors consisting essentially of any or a combination of 3,4,9,10-perylenetetracarboxylic dianhydride (PTCDA), fullerene, fullerene 70.

* * * * *